(12) United States Patent
Fernald et al.

(10) Patent No.: US 7,506,634 B2
(45) Date of Patent: Mar. 24, 2009

(54) IGNITION TIMING CIRCUIT

(75) Inventors: Kenneth Wilson Fernald, Austin, TX (US); Danny Joe Allred, Austin, TX (US)

(73) Assignee: Keterex, Inc., Austin, TX (US)

( * ) Notice: Subject to any disclaimer, the term of this patent is extended or adjusted under 35 U.S.C. 154(b) by 0 days.

(21) Appl. No.: 11/903,683

(22) Filed: Sep. 24, 2007

(65) Prior Publication Data

US 2008/0072876 A1 Mar. 27, 2008

Related U.S. Application Data

(60) Provisional application No. 60/847,583, filed on Sep. 27, 2006.

(51) Int. Cl.
*F02P 5/00* (2006.01)
*F02P 3/06* (2006.01)

(52) U.S. Cl. .................. 123/406.57; 123/601

(58) Field of Classification Search ............ 123/406.19, 123/406.57, 599, 418, 601, 602, 149 C, 355; 310/70 A, 218
See application file for complete search history.

(56) References Cited

U.S. PATENT DOCUMENTS

| | | | | | |
|---|---|---|---|---|---|
| 4,483,293 | A | * | 11/1984 | Akasu ................. | 123/406.53 |
| 4,694,799 | A | * | 9/1987 | Yagi et al. ............. | 123/406.42 |
| 4,856,479 | A | * | 8/1989 | Fujimoto et al. ....... | 123/406.16 |
| 5,722,370 | A | * | 3/1998 | Koike et al. ........... | 123/406.11 |
| 5,775,297 | A | * | 7/1998 | Koike et al. ........... | 123/406.51 |

* cited by examiner

*Primary Examiner*—John T Kwon

(57) ABSTRACT

An ignition timing circuit is disclosed which provides variable fuel ignition timing as a function of the rotational speed of a small internal combustion engine. A measure of the rotational speed of an engine is generated from the shape of pulses generated by a sensor. A timing delay circuit converts this measure of the rotational engine speed into a fuel ignition trigger signal with a controlled delay relative to the engine's angular position. This trigger signal activates a switching device which in turn delivers energy to the engine's spark plug system. A significant benefit of the disclosed ignition timing circuit is its ability to be enclosed in a package which is size and pin-compatible with standard silicon controlled rectifiers.

21 Claims, 4 Drawing Sheets

IGNITION TIMING CIRCUIT

This application claims the filing date of Sep. 27, 2006 established by provisional patent 60/847,583.

FIELD OF THE INVENTION

This invention relates generally to fuel ignition systems in internal combustion engines. More specifically, this invention relates to the generation of variable ignition timing in such engines.

BACKGROUND OF THE INVENTION

Internal combustion engines operate by igniting fuel in order to apply a force to a mechanical system. For example, in a piston engine the piston provides a movable surface which forms a combustion chamber. Fuel enters this chamber as the piston retracts and is then compressed as the piston advances to reduce the volume of the combustion chamber. When the fuel ignites, the chamber volume is forced to expand, thus pushing the piston and applying force to a drive system. The momentum of this drive system causes the piston to advance which expels the expended fuel and the process then repeats. The performance of such engines depends highly on the relationship between the piston position and the timing of the fuel ignition. For example, if the fuel is ignited before the piston reaches its top position (known in the art as "top dead center" or TDC) the force of the burning fuel will apply force to the drive system in the wrong direction. However, if the piston has moved well past TDC when the fuel ignites the energy applied to the drive system is reduced representing a loss of output power. This dependency on ignition timing is common to most internal combustion engines, including two-cycle and rotary engines. As such, nearly all such engines include a method of timing the fuel ignition with the state of the combustion chamber.

In small engines, such as those used in gasoline-powered lawn equipment, the ignition timing system comprises a permanent magnet embedded in a flywheel synchronized with the piston, a primary coil of wire and a secondary coil of wire. Both coils are wrapped about a ferrous armature which is located in close proximity to the flywheel. Each pass of the magnet generates a set of voltage pulse across the coils. Pulses generated in the primary coil are captured in a capacitor in the ignition timing circuit. Pulses generated by the secondary coil are used to initiate the transfer of this captured energy to a fuel igniter which serves to ignite the fuel. The position of the secondary coil determines the timing between the piston reaching TDC and the ignition of the fuel.

In small engines the desirable timing between TDC and fuel ignition varies with the operating conditions. For example, when first starting the engine, it is often desirable to delay the fuel ignition until the piston has passed TDC by several radial degrees. This allows for easier start-up, particularly for pull-rope engines. However, when the engine is operating at high revolutions per minute (RPM), better performance in terms of output power and reduced emissions is obtained by advancing the fuel ignition to just before the piston reaches TDC. Unfortunately, the timing of ignition in small engines is often controlled largely by the physical position of the secondary coil armature with respect to the piston position. Given this, such engines typically have a constant ignition delay measured in radial degrees. As such, this delay is often a compromise between ease-of-start and high-speed performance. Prior art attempts to provide variable ignition timing, such as those disclosed in U.S. Pat. Nos. 5,931,137, 6,408,820, 6,932,064, 6,973,911, and 7,069,921 implement multiple secondary coils and/or complicated circuitry which increase the complexity and cost of the engine's construction. As such, these solutions are poorly adapted to the low-cost engines typical of small hand-held equipment.

U.S. Pat. No. 5,931,137 describes an ignition apparatus for internal combustion engines which provides spark advance. The spark advance is generated by application of a trigger coil and an auxiliary coil wound about different permeable cores in close proximity to the engine's flywheel. The coils are connected to triggering circuitry. When the flywheel rotational speed crosses a design threshold, pulses from the auxiliary coil cancels pulses from the trigger coil, thereby providing spark advance at higher engine RPMs. This approach increases the cost and weight of an engine by requiring multiple coils and permeable cores. It can also provide only two spark advance settings, one for low RPM values and one for higher RPM values. The amount of spark advance is also limited by the physical location of the coils. An additional disadvantage is that this approach requires a complete redesign of the flywheel and armature system, thus increasing the cost of incorporating this invention or the cost of retrofitting an existing engine design.

U.S. Pat. No. 6,408,820 discloses an ignition system with automatic ignition advance.

This invention utilizes both a charging coil and a trigger coil connected to a circuit which produces a spark advance as a function of the amplitude of pulses generated by the trigger coil. As in the '137 patent, this approach increases the cost and weight of an engine by requiring multiple coils (and additional permeable core mass). Also, since this invention's circuitry requires multiple connections to these coils, its application would require considerable reworking on existing engine designs and can not be made pin-compatible with existing silicon controlled rectifiers. U.S. Pat. Nos. 6,932,064 and 7,069,921 disclose related inventions with similar limitations.

U.S. Pat. No. 6,973,911 discloses a device for controlling ignition timing for internal combustion engines which utilizes a single coil to both power the device and provide ignition timing as a function of engine speed. A coil produces pulses which are synchronous with the engine's operation. The device uses a comparator to detect these pulses and uses a microcontroller to measure the time between pulses in order to calculate the rotational speed of the engine. This calculation is used to determine an appropriate delay between each pulse and initiation of a spark. While this invention avoids the expense of additional coils and cores, it requires a microcontroller, thus adding considerable cost. This microcontroller also makes the device poorly suited for retrofitting of existing engine designs. This device also has limited performance since it calculates engine speed by measuring the delay between pulses over a complete rotation of the engine's flywheel, resulting in a slower response to changes in the engine's speed.

BRIEF SUMMARY OF THE INVENTION

The present invention addresses the aforementioned problems by providing variable ignition timing using the shape of pulses generated by a coil to estimate the rotational speed of the engine.

One aspect of the invention relates to the ability to determine the engine's RPM based on the shape of pulses generated by the primary or secondary coils and/or the delay between individual pulses in each set of pulses generated.

Another aspect of the invention relates to the ability to control the delay between a coil pulse and initiation of fuel ignition as a function of the measured RPM.

Another aspect of the invention relates to the ability to provide a variable ignition timing circuit which is "pin-compatible" or "footprint-compatible" with the silicon controlled rectifier (SCR) commonly used in engine ignition circuits.

Another aspect of the invention relates to the ability to provide a variable ignition timing circuit which minimizes the necessary changes to existing low-cost engine ignition systems.

Further aspects of this invention will become apparent in the Detailed Description and by reference to the attached drawings.

DETAILED DESCRIPTION OF THE INVENTION

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent devices and methods to those described herein. In other instances, well-known methods and devices have not been described in detail so as not to unnecessarily obscure aspects of the present invention.

Figure 1:
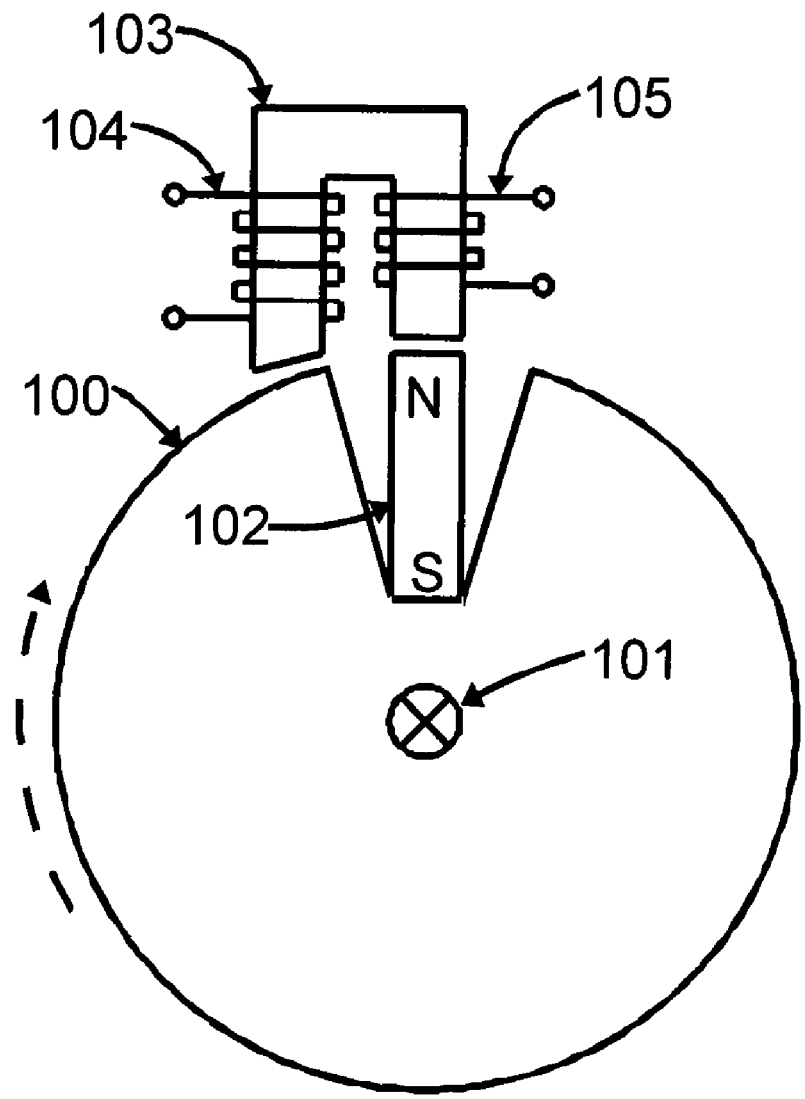
FIG. 1 illustrates a flywheel and armature configuration typical of small internal combustion engines.

The present invention is described in provisional patent 60/847,583 filed on Sep. 27, 2006. That provisional patent is included here in its entirely by reference. FIG. 1 illustrates a flywheel and armature configuration common in small engines. Flywheel 100 is attached to crankshaft 101 which is also attached to the piston (not shown). As crankshaft 101 rotates, permanent magnet 102 embedded at the edge of flywheel 100 passes near armature 103. As magnet 102 passes by the first leg of armature 103, primary coil 104 wrapped around that leg generates a set of voltage pulses whose amplitudes, widths, and temporal spacing are related to the rate-of-change of the magnetic field enclosed by primary coil 104. Likewise, as magnet 102 passes by the second leg of armature 103, secondary coil 105 wrapped around that leg generates a second set of voltage pulses whose amplitudes, widths, and temporal spacing are related to the rate-of-change of the magnetic field enclosed by secondary coil 105.

Figure 2:
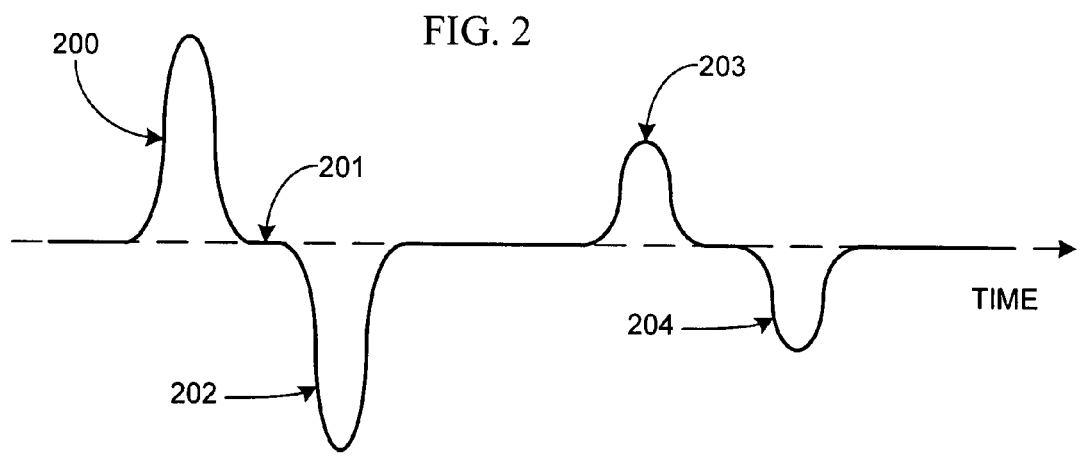
FIG. 2 illustrates pulses generated by the primary and secondary coils in an engine ignition system during low RPM operation.

FIG. 2 illustrates simplified voltage pulses generated by primary coil 104 and secondary coil 105 as flywheel 100 travels at a relatively slow RPM. As magnet 102 approaches the armature leg holding primary coil 104, the magnetic field enclosed by the coil begins to increase, resulting in voltage increase 200 generated between the terminals of the coil. As the magnet passes the leg, the magnetic field becomes relatively constant, causing the voltage between the terminals of the coil to return to near 0 volts, shown as voltage plateau 201. As magnet 102 begins to move away from the armature leg holding primary coil 104, the magnetic field enclosed by the coil begins to decrease, thus causing reverse polarity voltage pulse 202. Similarly, voltage pulses 203 and 204 are generated as magnet 102 travels past the armature leg holding secondary coil 105. Although FIG. 2 indicates pulse amplitudes from primary coil 104 being larger than those from secondary coil 105, the amplitude of the primary coil pulses relative to the amplitudes of the secondary coil pulses varies with the number of windings used to form each coil and their positions relative to the flywheel.

Figure 3:
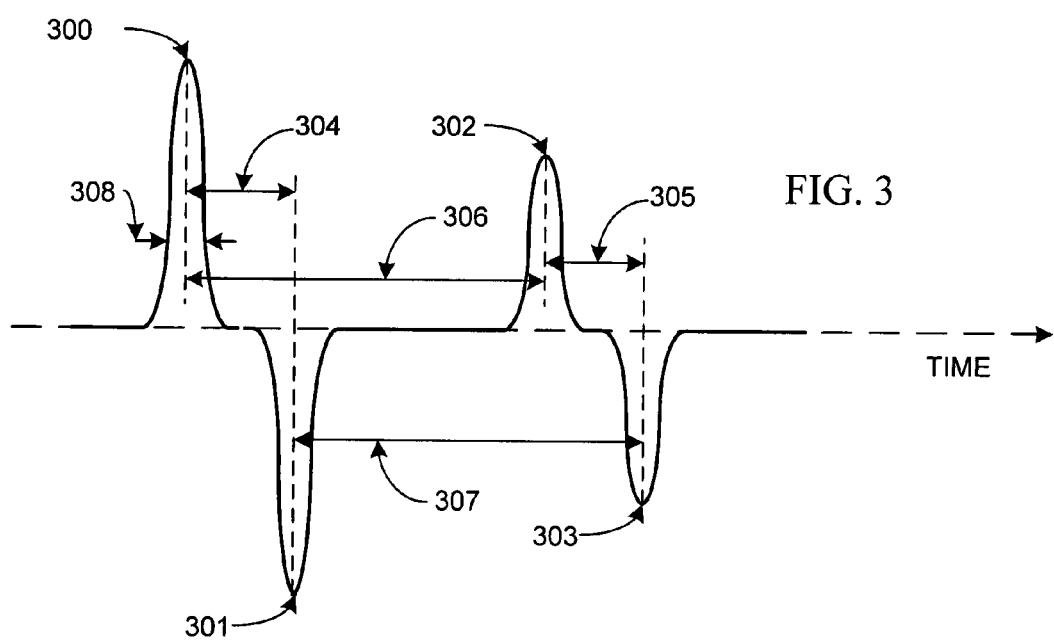
FIG. 3 illustrates pulses generated by the primary and secondary coils in an engine ignition system during high RPM operation.

FIG. 3 illustrates the simplified voltage pulses generated by primary coil 104 and secondary coil 105 as flywheel 100 travels at a relatively fast RPM. Relative to the case illustrated in FIG. 2, magnet 102 now travels pass each armature leg at a higher rate, thus causing the resulting magnetic field enclosed by each coil to change at a higher rate than illustrated in FIG. 2. As such, peak voltage amplitudes 300 through 303 are greater in value than the respective peak voltage amplitudes shown in FIG. 2. Similarly, since magnet 102 travels past the armature faster as the engine RPM increases, delay 304 between the two pulses generated by the primary coil is smaller than illustrated in FIG. 2. Likewise, delay 305 between the two pulses generated by the secondary coil is smaller than illustrated in FIG. 2. The delay between primary and secondary coil pulses 306 and 307 is also smaller than the case illustrated in FIG. 2. Finally, due to the increased speed of travel of the magnet, the widths of pulses generated across the coil terminals (for example, pulse width 308) are smaller than those generated in the slower RPM case. As such, one aspect of the disclosed invention is that the rotational speed of an engine can be measured using variations in coil pulse amplitudes, variations in coil pulse spacing in time, variations in the width of individual pulses, or by a combination these methods. For example, the spacing in time between two pulses (positive-going and negative-going) generated by the same coil (primary or secondary) or between a pulse generated by the primary coil and a pulse generated by a secondary coil, or a combination of both can be used to measure engine RPM. It should be noted that the pulse shapes and amplitudes shown in FIG. 2 and FIG. 3 serve only to illustrate the general shape of ignition pulses. The exact shape, amplitudes, and relationship to one another can vary according to engine speed and details of the engine, flywheel, armature, and coil designs.

Figure 4:
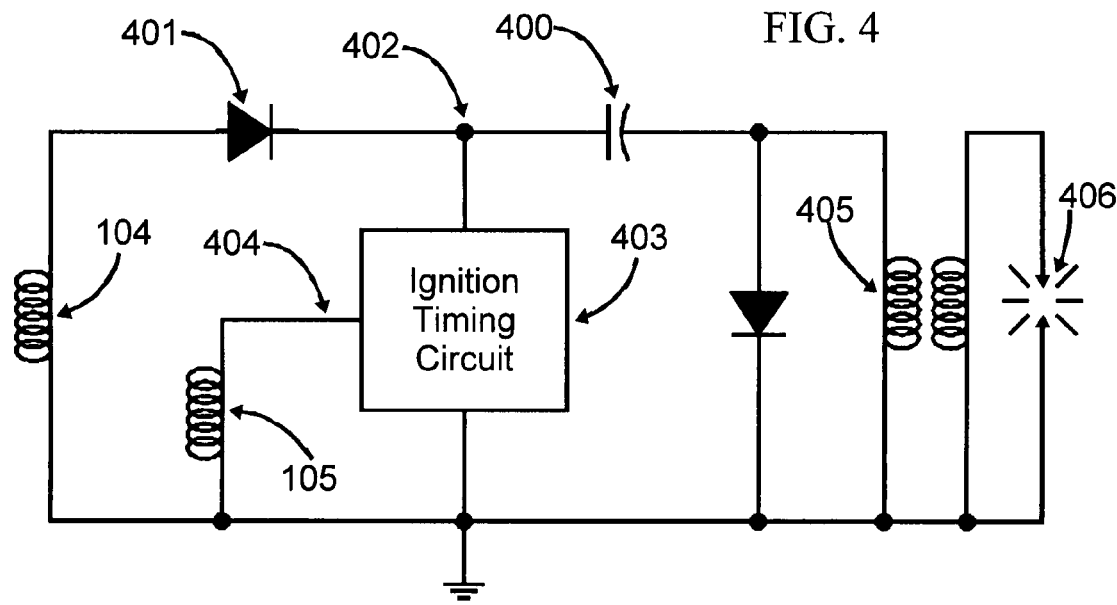
FIG. 4 illustrates a simplified schematic of an engine ignition system employing the present invention.

FIG. 4 illustrates a simplified schematic of an engine ignition system employing the present invention as a replacement for a silicon controlled rectifier common in the prior art. Energy from each positive-going pulse generated by primary coil 104 is captured onto capacitor 400 using diode 401 as a half-wave rectifier. The resulting voltage across capacitor 400 appears at node 402 which is connected to the ignition timing circuit 403. The pulse generated by secondary coil 105 is delivered to ignition timing circuit 403 by node 404 shared between secondary coil 105 and ignition timing circuit 403. Ignition timing circuit 403 then measures the engine RPM and generates a delay before shorting node 402 to ground. This action causes the voltage stored across capacitor 400 to appear across the primary of transformer 405. The resulting stepped-up voltage generated at the secondary of transformer 405 is delivered to spark-plug 406. The resulting spark ignites the fuel in the combustion chamber. One advantage of the present invention is illustrated by the fact that the ignition timing circuit, as shown in FIG. 4, can be constructed as a three-terminal device, thereby allowing the invention to replace a standard silicon controlled rectifier. This allows engines which incorporate simply SCR-based ignition circuits common in the prior art to benefit from the variable ignition timing provided by the present invention with minimal change in the engine's design. Though FIG. 4 illustrates a capacitive discharge ignition system (CDI), a person skilled in the art will understand that the disclosed invention can be applied to inductive ignition systems while maintaining all benefits provided by the invention.

Figure 5:
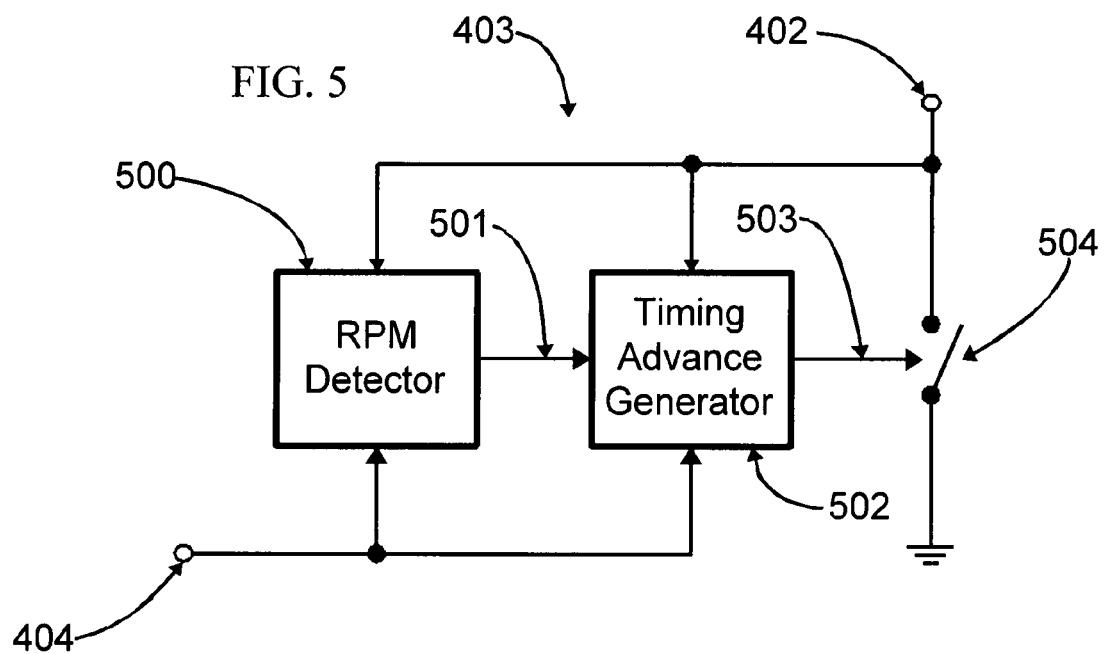
FIG. 5 illustrates a block diagram of one embodiment of the disclosed ignition timing circuit.

FIG. 5 illustrates a block diagram of one embodiment of ignition timing circuit 403. Pulses from secondary coil 105 are delivered to RPM Detector 500 via node 404. This detector generates RPM signal 501 which represents a measure of the engine rotational speed. RPM signal 501 may comprise a single wire or multiple wires whose voltage levels, current levels, frequency, width, or some other characteristic known in the art represents the measured RPM value. RPM signal 501 is generated using a measure of the received coil pulse amplitudes, a measure of the received coil pulse spacings in time, a measure of the received coil pulse widths, or a combination of such methods. For example, RPM signal 501 may be a function of the amplitude of a pulse received at secondary coil terminal 404. Alternatively, it may be a function of the delay between the positive-going and negative-going pulses generated by a single coil. It may also be a function of the delay between a pulse generated by primary coil 104 and a pulse generated by secondary coil 105. RPM signal 501 is received by timing advance generator 502. Timing advance generator 502 generates a delay between one of the received pulses and ignition signal 503 which initiates activation of switch 504. This delay is generated as a function of the measured RPM. Switch 504 applies the energy captured from primary coil 104 to transformer 405 and spark-plug 406. Switch 504 may be implemented as any one of many electrically controlled switches known to the art, including but not limited to mechanical relays, solid-state relays, silicon controlled rectifiers (SCR), TRIACs, IGBTs, and high-voltage transistors.

Figure 6:
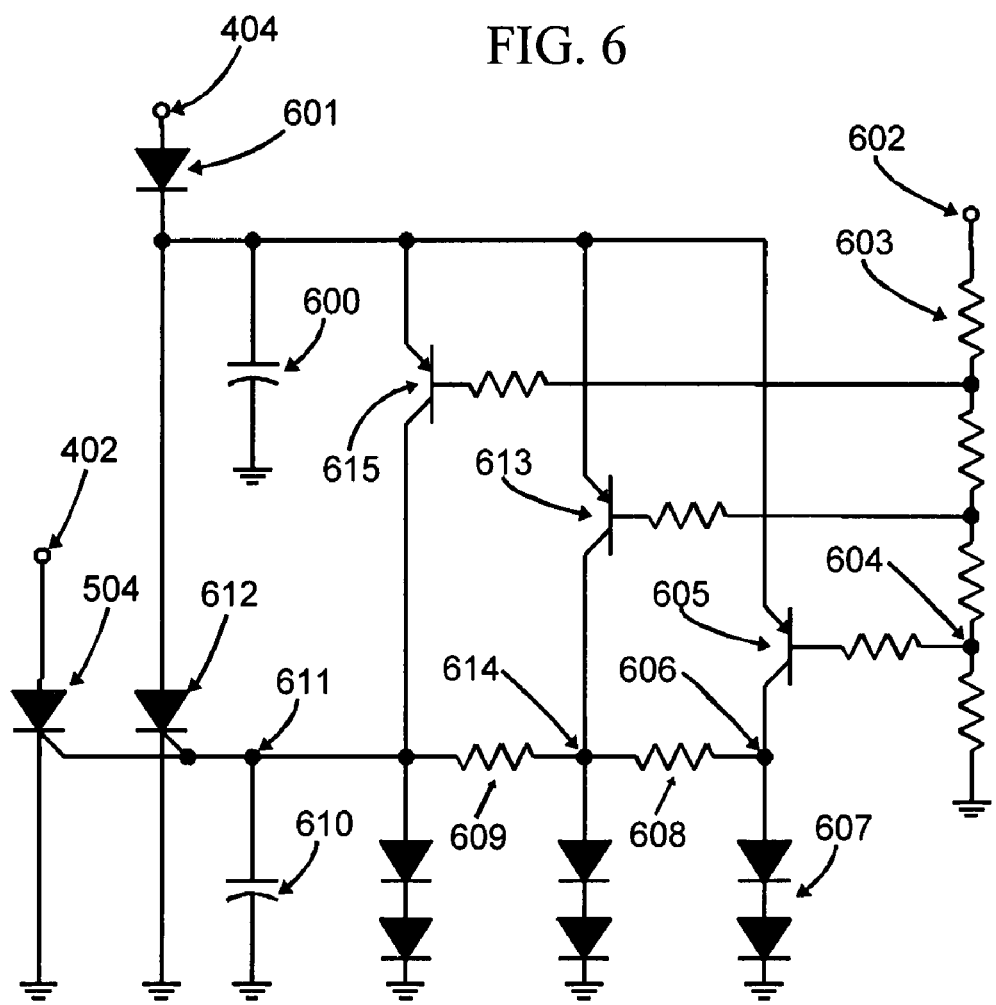
FIG. 6 illustrates a simplified schematic of one embodiment of the disclosed ignition timing circuit.

FIG. 6 illustrates a simplified schematic of a preferred embodiment of ignition timing circuit 403. The circuit shown generates a variable ignition delay as a function of the pulse amplitude generated by secondary coil 105. The pulses generated by primary coil 104 are received at node 402. Pulses generated by secondary coil 105 are received at node 404. The peak positive amplitude of the secondary pulse received at node 404 is captured onto capacitor 600 using diode 601 as a half-wave rectifier. An appropriate reference voltage is applied to terminal 602. This reference can be generated from energy captured from either the primary or secondary coil pulses (or both) using methods well known in the art. From this reference, resistor stack 603 generates a number of voltages decreasing in value from top to bottom (for example, voltage 604). If the peak voltage captured on capacitor 600 exceeds voltage 604 by more than the turn-on emitter-to-base voltage of transistor 605, transistor 605 will turn on allowing charge stored in capacitor 600 to flow into node 606. As the voltage at node 606 increases, diode stack 607 will turn on serving to limit the voltage at node 606 to approximately two diode threshold voltage values. As the voltage on node 606 increases, the stored charge on capacitor 600 will also flow through resistor 608, resistor 609, and into capacitor 610. The rate at which this charge will flow into capacitor 610 is controlled in part by the values of resistor 608 and 609. Once the charge flow into capacitor 610 causes its voltage to increase to the turn-on threshold of switch 612 (implemented here as an SCR), switch 612 will turn on and discharge the voltage stored on capacitor 600. At this same time, switch 504 will also turn on, thus shorting node 402 to ground. This action causes the stored voltage on capacitor 400 to be applied across transformer 405 as discussed above. At higher engine RPM values, the pulse amplitude captured on capacitor 600 will increase. When this increase is sufficient, transistor 613 will also turn on, allowing charge captured on capacitor 600 to flow into node 614, through resistor 609, and into capacitor 610. Since this charge will not flow through resistor 608, the delay before capacitor 610 reaches the voltage necessary to turn on switch 504 and switch 612 is reduced. Thus, a higher engine RPM will result in a shorter delay between the pulse arriving at node 404 and the delivery of the captured primary energy to transformer 405. Likewise, at even high engine RPMs, the captured voltage across capacitor 600 will cause transistor 615 to turn on. The resulting charge which flows through this transistor will travel through even less resistance before flowing into capacitor 610, resulting in a further reduction in the ignition delay time generated. Although the embodiment illustrated by FIG. 6 provides three delay levels, a person skilled in the art will understand that additional delay levels may be provided by adding circuitry similar to that shown. Likewise, the number of delay levels may be reduced by removing circuitry. Also, it should be noted that the coils shown in FIG. 1, FIG. 4, and FIG. 6 may be replaced with any device capable of detecting the rotational position of the flywheel (such as a Hall Effect Device, a reed switch, or an optical sensor) without compromising the benefits of the present invention. An important feature of the present invention is its ability to be designed as an integrated circuit which is pin-compatible with a silicon controlled rectifier, thus allowing variable ignition delay to be added to existing engine designs with minimal changes to the support circuitry or engine hardware.

While certain preferred embodiments have been described and shown in the accompanying drawings, it is to be understood that such embodiments are merely illustrative of, and not restrictive on, the broad invention. Other embodiments that are apparent to those of ordinary skill in the art, including embodiments that do not provide all of the features and advantages set forth herein, are also within the scope of this invention. Further, it is to be understood that this invention is not limited to the specific construction and arrangements shown and described since various modifications or changes may occur to those of ordinary skill in the art without departing from the spirit and scope of the invention.

The invention claimed is:

1. An ignition timing control circuit for use with an internal combustion engine, comprising:
a first sensor, wherein said first sensor produces a first set of one or more pulses as said engine's flywheel passes a first reference angular position;
a second sensor, wherein said second sensor produces a second set of one or more pulses as said engine's flywheel passes a second reference angular position;
an RPM detector circuit coupled to at least one of said first sensor and said second sensor, wherein said RPM detector circuit converts at least one of said first set of one or more pulses from said first sensor and said second set of one or more pulses from said second sensor into a measure of the rotational speed of said flywheel;
a timing advance circuit coupled to said RPM detector circuit and coupled to at least one of said first sensor and said second sensor, wherein the temporal delay between the activation of the output of said timing advance circuit and one of said first set of one or more pulses from said first sensor and said second set of one or more pulses from said second sensor is a function of said measure of the rotational speed of said flywheel;

a switching device coupled to said timing advance circuit, wherein said switching device is activated by said output of said timing advance circuit, this activation initiating delivery of energy to at least one fuel igniter in said engine.

2. The ignition timing control circuit of claim 1, wherein said first sensor is a coil.

3. The ignition timing control circuit of claim 1, wherein said first sensor is one of a Hall Effect sensor, a reed switch, a mechanical switch, or an optical sensor.

4. The ignition timing control circuit of claim 1, wherein said second sensor is one of a coil, a Hall Effect sensor, a reed switch, a mechanical switch, or an optical sensor.

5. The ignition timing control circuit of claim 1, wherein said switching device is one of a transistor, a silicon-controlled rectifier (SCR), a triode for alternating current (TRIAC), an insulated gate bipolar transistor (IGBT), or a mechanical relay.

6. The ignition timing control circuit of claim 1, wherein said RPM detector circuit converts one or more of the amplitude of at least one pulse from said second set of one or more pulses from said second sensor, the shape of at least one pulse from said second set of one or more pulses from said second sensor, the relative delay between one pulse from said second set of one or more pulses from said second sensor and a different pulse from said second set of one or more pulses from said second sensor, the relative delay between one pulse from said first set of one or more pulses from said first sensor and one pulse from said second set of one or more pulses from said second sensor, and the width of at least one pulse from said second set of one or more pulses from said second sensor into said measure of the rotational speed of said flywheel.

7. The ignition timing control circuit of claim 2, wherein said coil generates the energy to be delivered to at least one fuel igniter in said engine.

8. The ignition timing control circuit of claim 2, wherein said coil generates the energy to power at least a part of said ignition timing control circuit.

9. The ignition timing control circuit of claim 1, wherein said RPM detector circuit, said timing advance circuit, and said switching device are contained within a single package.

10. The ignition timing control circuit of claim 9, wherein the size and pin configuration of said package are compatible with a standard silicon controlled rectifier.

11. The ignition timing control circuit of claim 1, wherein said RPM detector circuit, said timing advance circuit, and said switching device are integrated together as a single semiconductor circuit.

12. An ignition timing control circuit for use with an internal combustion engine, comprising:

a sensor, wherein said sensor produces a set of one or more pulses as said engine's flywheel passes a reference angular position;

an RPM detector circuit coupled to said sensor, wherein said RPM detector circuit converts said set of one or more pulses from said sensor into a measure of the rotational speed of said flywheel;

a timing advance circuit coupled to said RPM detector circuit and coupled to said sensor, wherein the temporal delay between the activation of the output of said timing advance circuit and said set of one or more pulses from said sensor is a function of said measure of the rotational speed of said flywheel;

a switching device coupled to said timing advance circuit, wherein said switching device is activated by said output of said timing advance circuit, this activation initiating delivery of energy to at least one fuel igniter in said engine.

13. The ignition timing control circuit of claim 12, wherein said sensor is a coil.

14. The ignition timing control circuit of claim 12, wherein said sensor is one of a Hall Effect sensor, a reed switch, a mechanical switch, or an optical sensor.

15. The ignition timing control circuit of claim 12, wherein said switching device is one of a transistor, a silicon controlled rectifier (SCR), a triode for alternating current (TRIAC), an insulated gate bipolar transistor (IGBT), or a mechanical relay.

16. The ignition timing control circuit of claim 12, wherein said RPM detector circuit converts one or more of the amplitude of at least one pulse from said set of one or more pulses from said sensor, the shape of at least one pulse from said set of one or more pulses from said sensor, the relative delay between one pulse from said set of one or more pulses from said sensor and a different pulse from said set of one or more pulses from said sensor, and the width of at least one pulse from said set of one or more pulses from said sensor into said measure of the rotational speed of said flywheel.

17. The ignition timing control circuit of claim 13, wherein said coil generates the energy to be delivered to at least one fuel igniter in said engine.

18. The ignition timing control circuit of claim 13, wherein said coil generates the energy to power at least a part of said ignition timing control circuit.

19. The ignition timing control circuit of claim 12, wherein said RPM detector circuit, said timing advance circuit, and said switching device are contained within a single package.

20. The ignition timing control circuit of claim 19, wherein the size and pin configuration of said package are compatible with a standard SCR.

21. The ignition timing control circuit of claim 12, wherein said RPM detector circuit, said timing advance circuit, and said switching device are integrated together as a single semiconductor circuit.

* * * * *